Figure 1:
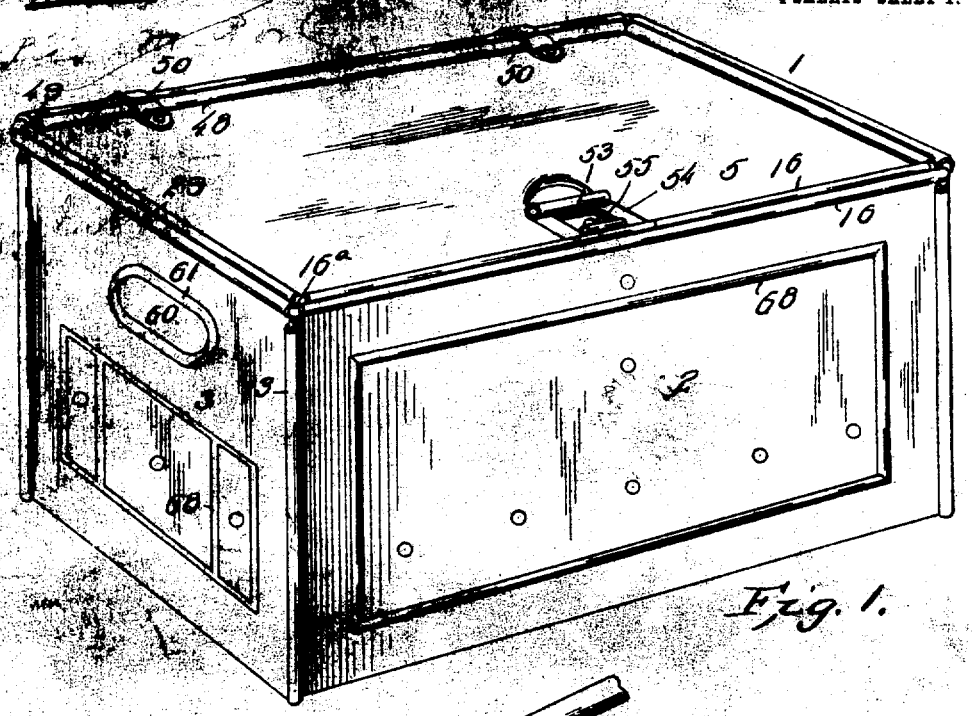

BEST AVAILABLE COPY

1a

[illegible] & J. F. FINK.

[illegible]

Patented Nov. 6, 1906. Application filed [illegible]

Re 13,038.

4 SHEETS—SHEET 1.

Witnesses:

L. L. Armstrong

H. E. Costello

Inventors:

G. Klenk

J. F. Fink

By H. H. Bliss

Attorney

71
G. KLENK & J. F. FINK.
METAL BOX.
APPLICATION FILED OCT. 16, 1907.
Reissued Nov. 9, 1909.
13,038.
4 SHEETS—SHEET 2.
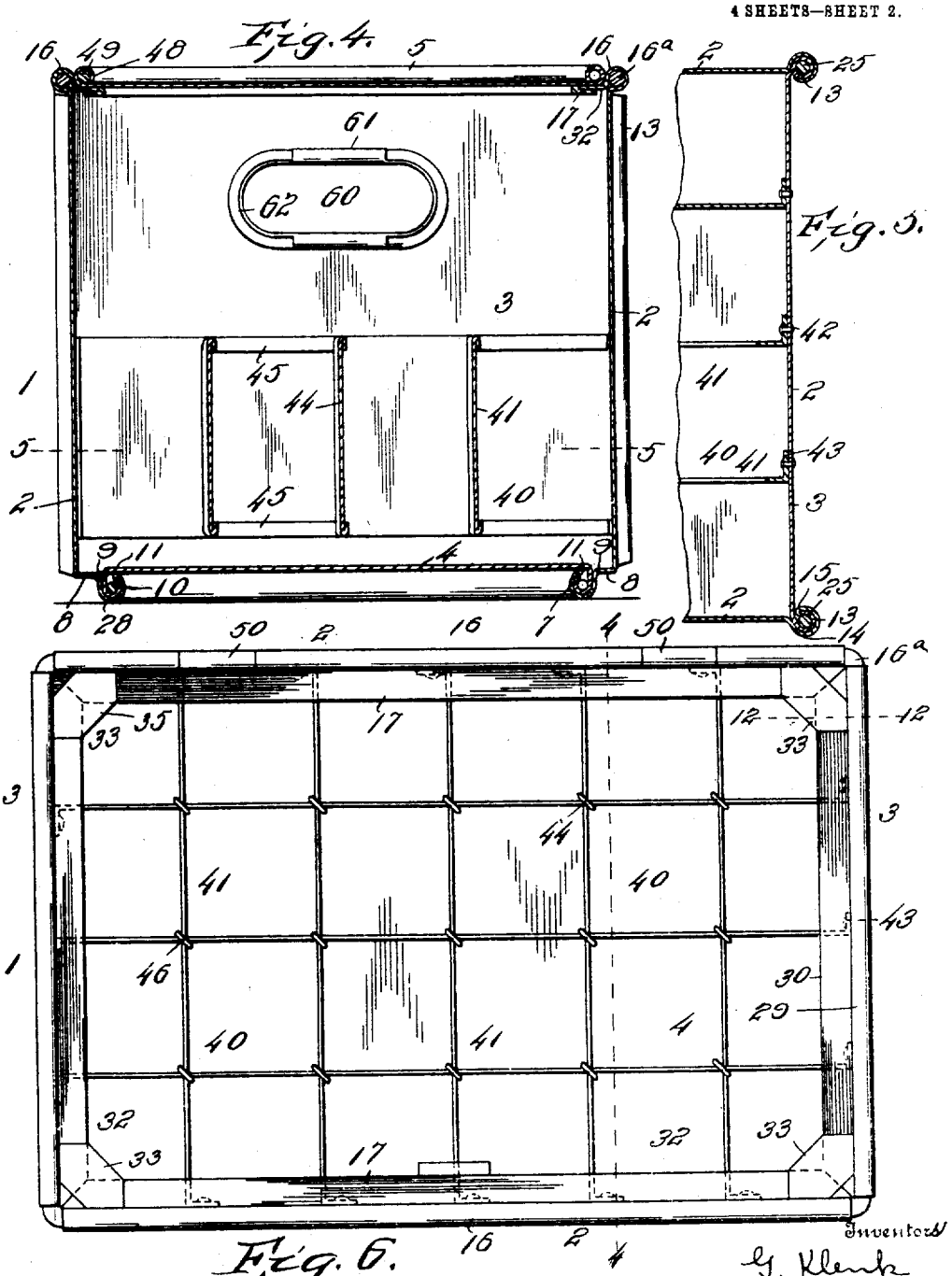
Witnesses
L. L. Armstrong.
N. E. Costello.
Inventors
G. Klenk
J. F. Fink
By H. H. Bliss
Attorney
ANDREW B. GRAHAM CO., PHOTO-LITHOGRAPHERS, WASHINGTON, D. C.

220. METALLIC RE-PATENT.
7
G. KLENK & J. F. FINK.
METAL BOX.
APPLICATION FILED OCT. 16, 1907.
Reissued Nov. 9, 1909.
13,038.
4 SHEETS—SHEET 3.
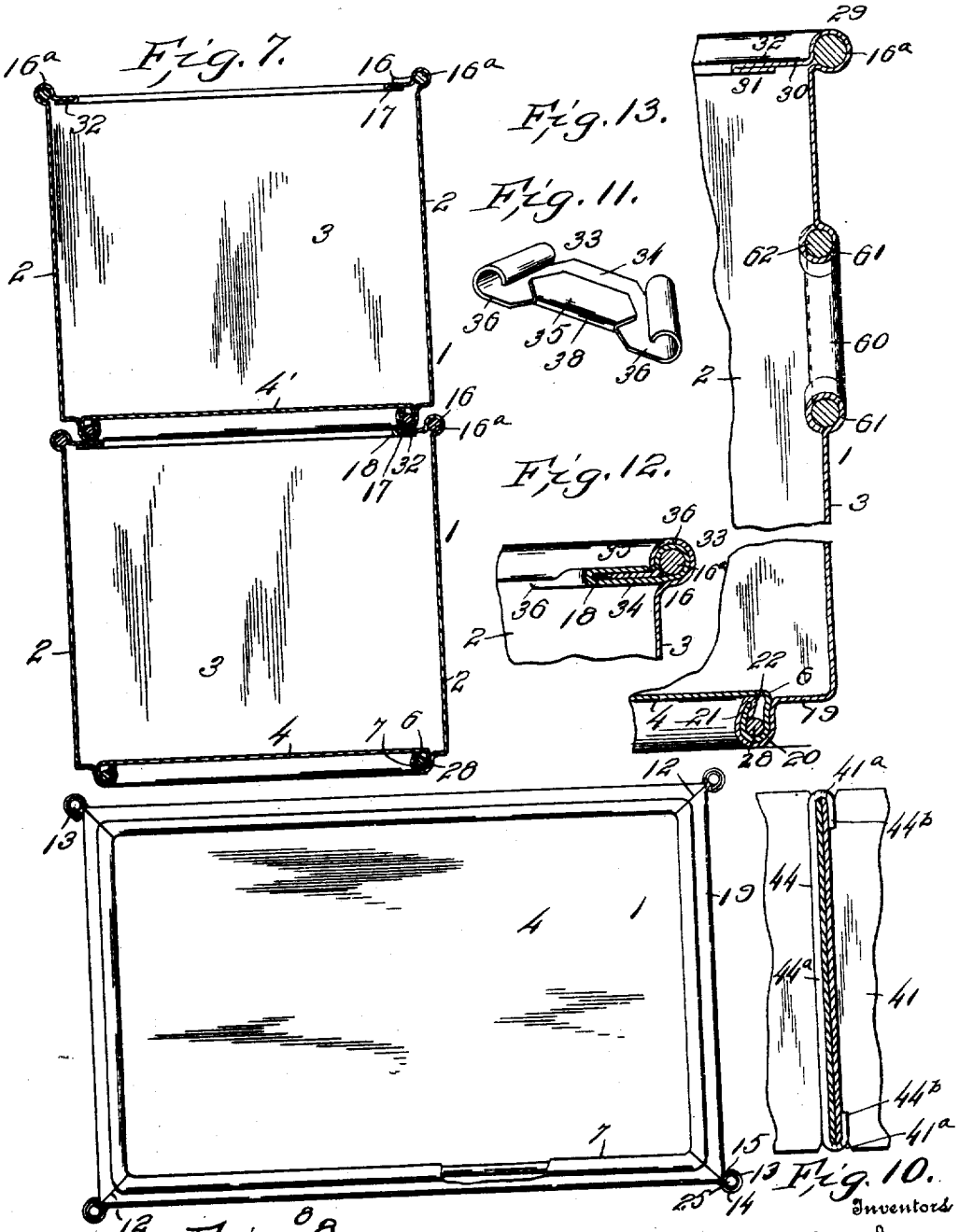
Witnesses
L. E. Armstrong
N. E. Costello.
Inventors
G. Klenk
J. F. Fink
By H. H. Bliss
Attorney

G. KLENK & J. F. FINK.

METAL BOX.

APPLICATION FILED OCT. 16, 1907.

Reissued Nov. 9, 1909.

13,038.

4 SHEETS—SHEET 4.

Witnesses

L. L. Carnathan

N. E. Costello.

Inventors

G. Klenk

J. F. Fink

By H. H. Bliss

Attorney

ANDREW B. GRAHAM CO., PHOTO-LITHOGRAPHERS, WASHINGTON, D. C.

71

UNITED STATES PATENT OFFICE.

GOTTLIEB KLENK AND JACOB F. FINK, OF DEFIANCE, OHIO, ASSIGNORS, BY MESNE ASSIGNMENTS, TO DEFIANCE PRESSED STEEL COMPANY, A CORPORATION OF OHIO.

METAL BOX.

13,038. Specification of Reissued Letters Patent. Reissued Nov. 9, 1909.

Original No. 778,680, dated December 27, 1904, Serial No. 216,834. Application for reissue filed October 16, 1907. Serial No. 397,760.

*To all whom it may concern:*

Be it known that we, GOTTLIEB KLENK and JACOB F. FINK, citizens of the United States of America, and residents of Defiance, county of Defiance, and State of Ohio, have invented certain new and useful Improvements in Metal Boxes, of which the following is a specification.

Our invention relates to improvements in metal beer-boxes provided with peculiarly-arranged partitions to form compartments for the reception of the bottles and specific and minor details of construction to strengthen the structure.

The prime object of our invention is to provide a metal box with a nominal number of parts, seamed and fastened, whereby great strength and durability will result.

A further object of our invention is to construct a seam at the bottom of the box to provide a projecting flange and arrange a support at the top to receive a flange of a companion box when they are stored or packed.

We also provide specific improvements in the seams at the corners of the box to resist the force of blows due to the rough handling boxes of this type are subjected to.

The invention also comprehends specific improvements of the partitions forming the bottle-compartments, as well as the particular manner of attaching them.

Furthermore, our invention relates to the specific construction of the means employed for locking the cover, the same consisting of a spring-hasp on the box and a coacting pivoted engaging member on the cover.

Many other objects and advantages will be hereinafter referred to and be particularly pointed out in the claims.

Figure 2:
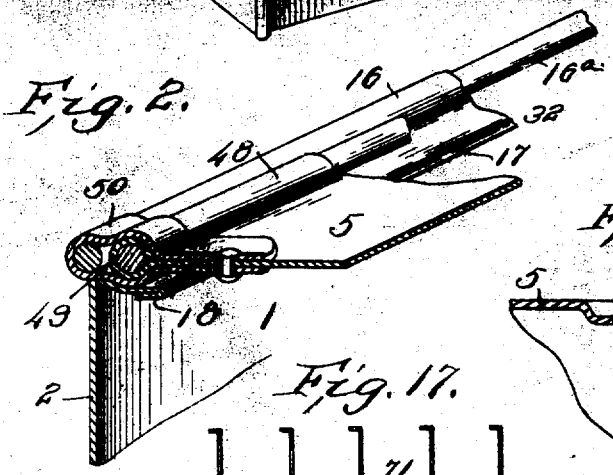
Figure 3:
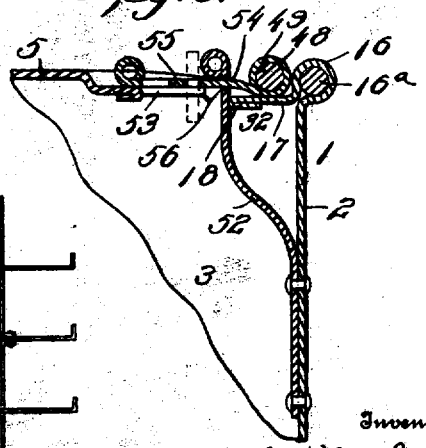
Figure 17:
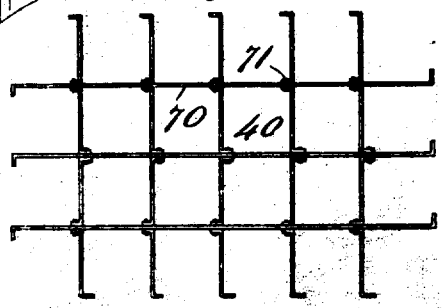
Figure 14:
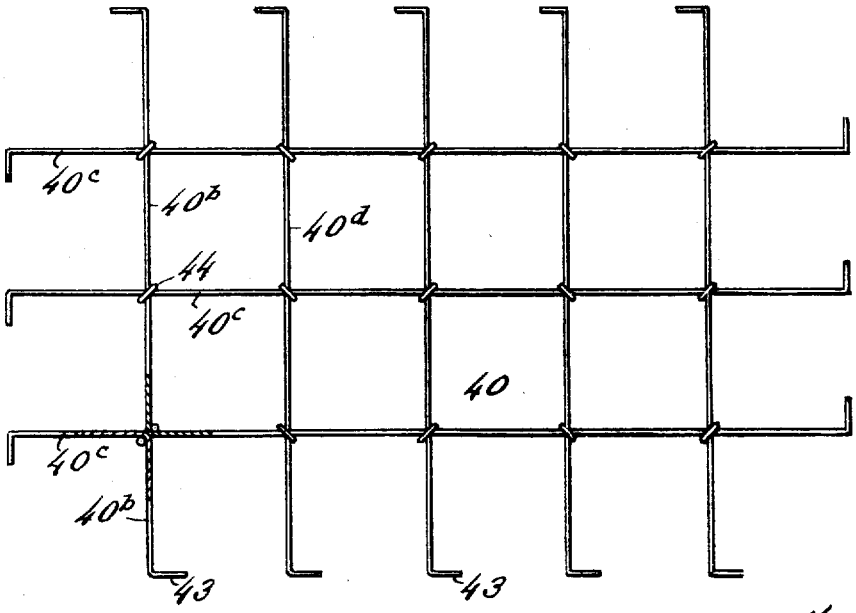
Figure 15:
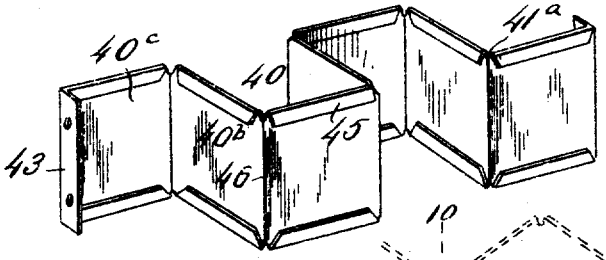
Figure 16:
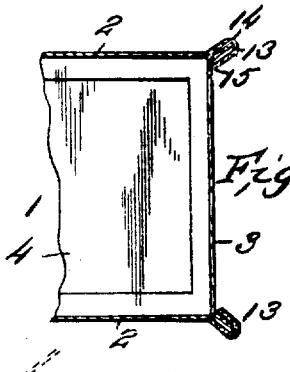
Figure 9:
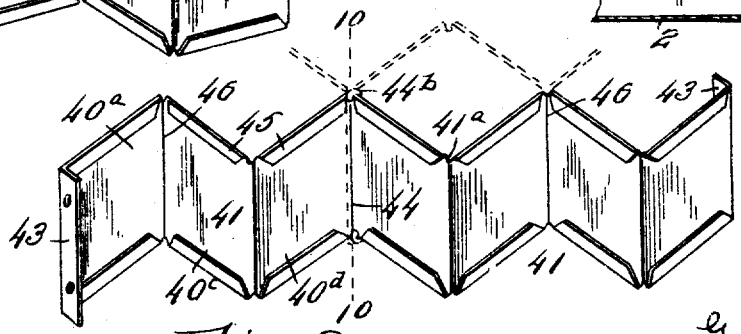

In the drawings,—Figure 1 is a perspective view of our improved box. Fig. 2 is a detail sectional perspective view of the hinge connection of the cover. Fig. 3 is a detail section of the locking device. Fig. 4 is a transverse sectional view on the line 4 4, Fig. 6. Fig. 5 is a detail horizontal section on the line 5 5, Fig. 4. Fig. 6 is a top plan view of the box, the cover being open. Fig. 7 is a diagrammatic view illustrating how our improved box may be packed. Fig. 8 is a bottom plan view to more fully disclose the flange-bead at the bottom of the box. Fig. 9 is a detail perspective view of several bottle-compartments. Fig. 10 is a detail section of the same on line 10 10, Fig. 9. Fig. 11 is a detail perspective view of a corner-brace. Fig. 12 is a sectional view of the brace in position, taken on the line 12 12, Fig. 6. Fig. 13 is a vertical section taken through the end of the box. Fig. 14 is a plan view of a modified form of bottle-compartment. Fig. 15 is a detail view of the same. Fig. 16 is a detail view of a modified form of corner of our box. Fig. 17 is a detail plan view of a modified form of compartment.

The same numerals refer to like parts in all the figures.

1 represents a box, as an entirety; 2 2, the side sections; 3 3, end sections; 4, the bottom, and 5 the cover. The bottom is constructed of sheet metal and has its outer edges turned down, as at 6, and up at 7 to form a part of an interlocking seam which binds the side and end sections. Each side section 2 has its lower end bent at right angles to form a rest 8. From the rest there is another bend 9, which is again bent up at 10, and then it is bent upon itself at 11. The lower corners of the side sections are mitered at 12 to make a neat joint when the box is set up. The ends of the end sections 3 are constructed in substantially the same manner as the lower edge to form an interlocking corner-seam 13. Each end of the side is bent at 14 and bent over on itself, as at 15. The upper end of the side section is bent around a wire 16[a] to form a retaining-flange 16, and then bent in at 17 toward the center of the box and at its free end 18 it is turned on itself to reinforce the edge. The end sections 3 3 are similar, each having its lower end bent like the lower end of the side sections, 19 indicating the rest, 20 the bent flange extending therefrom, 21 the upturned part of the flange, and 22 the final or reinforcing bend. The bottom, side, and end sections are joined as herein indicated; but before the final crimp is given a stout piece of wire is positioned within the bent terminals of the bottom and the sections, and it extends entirely around the box, said wire being tightly held within the flanges by the final crimp given to the latter. A strong stiff outwardly-projecting flange is thus formed entirely around the bottom of the box just inside of a surrounding rest. Obviously a flange or bead so formed will resist the strain usually given a beer-box, and will at the same time materially strengthen the structure throughout. The ends of the end sections are bent in the form of a circle to form a bead which is incased in the bend 14, the free edge fitting snugly between the terminals 15 and the bend 14. Before the ends of the sections 2 3 are crimped to form the corners of the box a short section of wire or the like 25 is placed in position to be securely gripped by the final crimp, as clearly shown in Fig. 5 of the drawings. The wire 25 may be omitted, as shown in Fig. 16, although the other form is preferred. If the flange or bead at the corners and bottom of the box fails to withstand a blow, the reinforcing-wires will, so that a strong and positive structure is produced. The upper edges of the end sections are bent around the wire 16[a] to form a retaining-flange 29 and bent in to form a support 30, which is reinforced at 31 in exactly the same manner as the side sections 2. The wire 16[a], like 28, extends entirely around the box and within the flanges to more firmly hold the sections together.

The supports 17, 30, form an inwardly-extending surrounding strengthening-flange 32, mitered at the corners to make a neat finish, and they are reinforced by a reinforcing-clip 33. The clip consists of a base 34, adapted to take under the support 32, an overlapping flap 35 to engage over the top of said support, and two wings 36 36 to surround the wire 16[a] in the top edges of the side and end sections 2 and 3. The clips rigidly bind the upper corners of the box, the bends 38 holding them against the support 32, while the wings hold them against displacement in the opposite direction. Strain in either direction is therefore overcome at the corners and at the same time the support 32 is materially reinforced.

The compartments for holding the bottles constitute an important element of our invention, and the construction and advantages derived therefrom will now be specifically pointed out. The compartments 40 are formed by a plurality of zigzag metal sections 41, notched at 41[a] and fastened to the sides or ends by the rivets 42, passing through flanged ends 43, and abutting corners of the sections being secured together by ties 44, which fit in the notches 41[a]. Each section is zig-zag in plan view, and to reinforce them the upper and lower edges overlap, as at 45, and at the same time sharp corners are obviated. Each compartment is formed by two angular bends in two similarly-arranged sections, and, as stated, the vertical abutting corners 46 are secured by ties 44. A tie consists of a piece of wire 44[a], having its ends 44[b] bent upon itself to embrace the upper and lower edges of the two abutting sections.

In Figs. 14 and 15 we have shown a modified form of bottle-compartment which consists of a series of sections bent to form portions of squares in a direct plane. Each partition is bent at its ends to provide securing-flanges 43, wall 40[b], which is parallel with the end of the box, and right angles to form a wall 40[c], which is parallel with the sides of the box, and back again at 40[d] and at right angles again with the side, and so on across the box. It will be seen that in this instance the compartments are formed in rows parallel with the box, the bent portion of a partition forming practically three sides, while the fourth side is formed by the adjacent partition or the side of the box, as the case might be. The abutting corners of the partitions are connected with ties 44, as before described.

We may use a cover 5 for the box, and it consists of a metal sheet with a bead 48 surrounding its edges, in which is placed a strengthening-wire 49. Hinges 50 are fastened by rivets to the cover and encircle the wire 16[a], the side 2 being cut away to accommodate them. In order that the cover may be held in the closed position, we have devised a specific form of locking device, which consists of a spring hasp 52, fastened to the inside of the front section 2 and extending upwardly through an opening 53 in the cover. An engaging member 54 is mounted to swing on the wire 49, and 55 is a tongue projecting from said member, the tongue being arranged to engage an opening 56 in the hasp 52. Obviously when the cover is closed the hasp will be forced from the side and the tongue engaged therewith, whereupon a pin or other locking means may be employed to fasten the parts together. A slight countersink is formed in the cover to make the engaging member lie flush with the upper surface, so as not to interfere with the stacking of the boxes.

The end sections 3 3 have hand-openings 60, each of which is surrounded by a bead 61 to receive a metal handle 62. The upper and lower parts of the bead are extended to embrace the handle 62 to provide suitable means for fastening them in position, which also serves to present a smooth surface for the fingers to take hold of.

A metal beer-box thus constructed is extremely simple and durable and by reason of the location of the various beads and their reinforcements liability of crushing the box by unusual strains and knocks is reduced to a minimum. The top edge of the box is especially made strong, since it is at this place most of the hard wear usually takes place. Furthermore, the corners, while probably not receiving the same rough treatment as the top edges, are constructed in a manner calculated to resist the wear and tear due at these points to make the box stand and prevent it collapsing when stacked. The flange or bead at the bottom is also regarded as peculiarly beneficial in a structure of this type, as it serves to distribute the weight of the bottles throughout the whole box. The beads in themselves would serve the purpose to a limited extent; but when the heads are combined with the incased wire connecting and binding the beads of the sections together the importance of this feature can well be appreciated.

Our box is particularly well adapted for stacking one upon the other, as indicated in Fig. 7. The flange and rest on the bottom of one fits the support and its adjacent bead on the top of the next box, so that the weight of the boxes to a large extent is relieved as much by the support as the adjacent bead, therefore distributing the strain. The lateral strain on the side and end sections is taken care of by the arrangement of the compartment-partitions, and as these partitions are not fastened to the box structure in direct line with each other any undue pull at a particular point will be uniformly distributed throughout the whole series of sections. This is due to the fact that the partitions are of zigzag reinforced construction and connected together at abutting corners.

If desired, we may form reinforcing-beads at the sides, ends, bottom, and the cover, as shown at 68, any suitable outline being employed.

Our box is constructed altogether of sheet metal, except at the reinforced places indicated, and as such articles are subject to unusually rough treatment we have sought to provide against all weaknesses with a view of producing a box which is cheap and durable.

We may form the compartments by constructing a series of parallel partitions 70, fastened at the ends of the box, and intermediate partitions with oppositely disposed end flanges 71, fastened by rivets to the partitions 70.

What we claim as new is—

1. A metal beer-box made in sections, having the upper edges reinforced, the sections being interlocked and seamed to provide an outwardly-projecting flange at the bottom of the box, and a rest adjacent and between the box sides and ends and the flange, substantially as described.

2. A metal box made in sections having the upper edges reinforced, the sections being seamed to provide an outwardly-projecting flange at the bottom of the box, a separate reinforcing element inclosed within the flange, and a rest adjacent and between the box sides and ends and the flange, substantially as described.

3. A metal box made in sections having the upper edges reinforced, the sections seamed to provide an outwardly-projecting flange at the bottom of the box, a rest adjacent and between the box sides and ends, and the flange, and interlocking seams at the corners of the box to form outwardly-projecting flanges, substantially as described.

4. A metal box made in sections having the upper edges reinforced, the sections being interlocked and seamed to provide an outwardly-projecting flange at the bottom of the box, a rest adjacent and between the box sides and ends and the flange, and metal compartments formed in sections connecting the sides and ends of the box, substantially as described.

5. A metal box made in sections having the upper edges reinforced with an inwardly-projecting support, the reinforced edges having an internal strengthening element, the sections being seamed to form an outwardly-projecting flange at the bottom of the box, and a rest surrounding the flange at the outside, substantially as described.

6. A metal box made in sections and comprising sides, ends and bottom, the corners of the sides and ends being seamed to form outwardly-projecting flanges, the upper edges of the sides and ends being reinforced, the sides, ends, and bottom being seamed at the bottom of and a short distance from the edges of the box to form an outwardly-projecting flange, substantially as described.

7. A metal box made in sections and comprising sides, ends, and bottom, the corners of the sides and ends being interlocked and seamed to form outwardly-projecting flanges, reinforcing elements incased within said flanges, the sides and ends having beads and a supporting-flange at their upper edges, a strengthening element within the beads, and an outwardly-projecting flange at the bottom of and a short distance from the edge of the box, substantially as described.

8. A metal box made in sections, means securing the sections together, each section being reinforced at its upper edge, and a clip connecting the upper corners of the sides and ends, said clip consisting of a base and extended wings, and an overlapping flange, the wings being held by the reinforcement at the upper edges, substantially as described.

9. A metal box made in sections, means securing the sections together, each section being reinforced at its upper edge and also having an inwardly-projecting support, and a clip at the corners of the end and side sections, said clip engaging the upper and lower sides of the support, and held in position by the reinforcement, substantially as described.

10. A metal box having a series of zigzag sections extending from side to side of the box, flanges at the ends of the sections, means securing the flanges to the box, and ties having hooked ends connecting the abutting corners of the sections, said hooked ends engaging two abutting sections and holding the same together, substantially as described.

11. A metal box made in sections, the seams of the sections interlocking and extending from the box, a depressed reinforced support at the top of the box, a cover bent over at its outer ends and reinforced by a rod embraced by the bent-over ends, said reinforced ends being seated in the reinforced support, and means for securing the cover, substantially as described.

12. A metal box having a plurality of partitions having angles which abut against each other, notches formed in the edges of the angles, and ties connecting the partitions at the angles, said ties fitting the notches, substantially as described.

13. A metal box having a plurality of partitions having angles which abut against each other, ties having hooked ends connecting the top and bottom of said abutting sections, and reinforcing-flanges along the top and bottom of the sections.

14. A metal beer-box made in sections, each section having beads formed on all corners, a top-reinforcing element at the top, the beads at the top of the sections engaging the top-reinforcing element, a bottom-reinforcing element, the beads at the bottom of the sections engaging the bottom-reinforcing element, corner-reinforcing elements, the beads at the corners of the sections engaging the corner-reinforcing elements, and corner-clips at the upper corners of the box.

15. A rectangular metal box made of a plurality of sections of sheet metal, having the upper edges reinforced, the sheet metal sections being interlocked and seamed to provide an outwardly and downwardly projecting flange on the bottom of, and a short distance from the bottom edges of the box and parallel to said bottom edges and being shaped to provide a rest adjacent and between the bottom edges and the flange, said rest being in the same vertical planes as the upper reinforced edges of the box, the upper reinforced edges, the rest and the downwardly projecting flange at the bottom of the box each being rectangular in configuration.

16. A metal box made in sections and having sides, ends and bottom, the vertical edges of the sides and ends being interlocked and seamed to form flanges on the exterior of the box, the sides and ends having beads at their upper edges, an inner supporting flange below the said beads adapted to reinforce the upper edges of the box, a strengthening element within the beads, the section being seamed to provide an outwardly and downwardly projecting flange on the bottom of, and a short distance from the bottom edges of the box and parallel to the said bottom edges.

17. A rectangular metal box made in sections and comprising sides, ends and bottom, the vertical edges of the sides and ends being interlocked and seamed to form flanges on the exterior of the box, the sides and ends having beads at their upper edges, an inner supporting flange below the said beads adapted to reinforce the upper edges of the sides and ends, a strengthening element within the beads, the sections being seamed to provide an outwardly and downwardly projecting flange on the bottom of, and a short distance from the bottom edges of the box and parallel to the said bottom edges, said downwardly projecting flange being in the same vertical planes with the said inner supporting flange.

Signed by us at Defiance, Defiance county, Ohio, this 14 day of October, 1907.

GOTTLIEB KLENK
JACOB F. FINK.

Witnesses:
HENRY B. HARRIS,
JULIUS J. BLAIR.